Feb. 2, 1932.     W. S. PRITCHARD     1,843,782
MEASURING VALVE
Filed Oct. 5, 1925

Inventor
William S. Pritchard
By Whittemore Hulbert Whittemore
& Belknap    Attorneys Patented Feb. 2, 1932

1,843,782

UNITED STATES PATENT OFFICE

WILLIAM S. PRITCHARD, OF DETROIT, MICHIGAN, ASSIGNOR TO MOTOR PRODUCTS CORPORATION, OF DETROIT, MICHIGAN, A CORPORATION OF NEW YORK

MEASURING VALVE

Application filed October 5, 1925. Serial No. 60,583.

This invention relates to measuring valves or metering devices and more especially to devices of this character particularly adapted for use in connection with lubricating systems.

The invention is designed particularly for use in connection with that type of lubricating systems wherein the lubricant is conducted for distribution at a plurality of points as for instance a plurality of bearings on a motor vehicle. In systems of this character the lubricant is forced under pressure through a system of conduits to the several points of distribution in succession. Such systems usually comprise a plurality of conduits each of which includes a number of branch conduits connected to a number of bearings and the lubricant, when under pressure, is applied first to the most remote bearings and then successively to the nearer bearings as the preceding ones have been supplied, to their capacity, with lubricant.

However it frequently happens that one or more bearings because of wear or of damage thereto, permit the escape of lubricant so that all of the lubricant in any one of the branches of the system may, without detection by the operator, be forced out through the loose bearing so that as a consequence the remaining bearings associated with that branch of the system do not have lubricant supplied thereto.

It is therefore an important object of this invention to provide a measuring valve, located at each bearing, for use in connection with this character of lubricating systems and so designed as to permit only a predetermined measured amount of lubricant to be supplied each bearing at each operation, thereafter preventing the further passage of lubricant so that particular bearing, wherein systems of the herein described character may satisfactorily function irrespective of the condition of the bearings at the several points of distribution.

Figure 1:
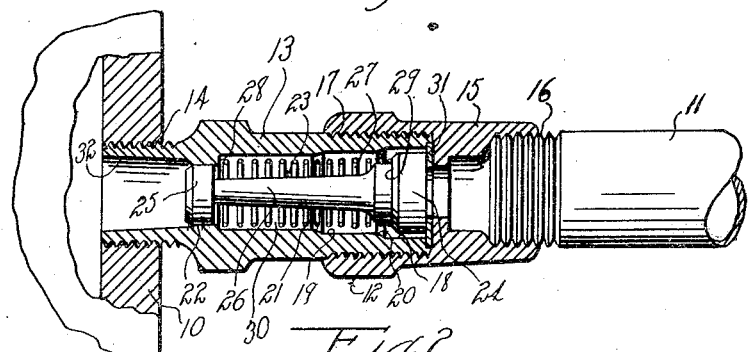
Figure 2:
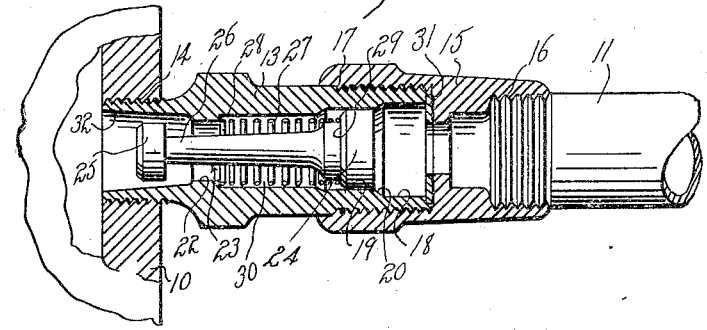
Figure 3:
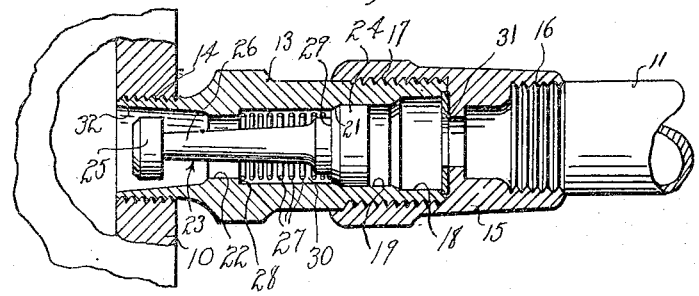

The invention has also among its objects to simplify, render more efficient, and improve generally devices of this general character and the above as well as other objects, advantages, and novel details of construction, will be made more apparent as this description proceeds, especially when considered in connection with the accompanying drawings, wherein Figure 1 is a longitudinal sectional view through a measuring valve constructed in accordance with this invention;

Figure 2 is a similar view with the parts of the valve in their intermediate position; and Figure 3 is a similar view with the parts of the valve in an extreme position opposite to that illustrated in Figure 1.

Referring now particularly to the drawings wherein like reference characters indicate like parts it will be noted that there is illustrated conventionally a point of distribution for the lubricant such as the bearing 10 and a lubricant source of supply or conduit 11. The metering device or measuring valve is indicated generally by the reference character 12 and consists of a body portion 13 preferably externally threaded as at 14 for engagement with the bearing 10 and further provided with a sleeve-like extension 15 internally threaded as at 16 for engagement with the end of the lubricant supply conduit 11. Obviously if desired the sleeve-like extension 15 may be eliminated and the valve body 13 directly connected by means of the externally threaded portion 17 with the lubricant supply conduit.

The valve body 13 is provided with a central bore extending longitudinally therethrough so as to afford a passage for the lubricant supplied through the conduit 11 whereby this lubricant may be conducted, in measured amounts, in a manner to be hereinafter described, to the bearing or other points of distribution 10.

The bore of the valve body 13 is formed with a portion 18 having a relatively large diameter which merges into a portion 19 of a relatively smaller diameter. The wall of the bore of the valve body intermediate the portions 18 and 19 thereof is inclined as shown at 20. A circumferential valve seat 21 is formed adjacent one end of the portion 19 of the bore for accommodating the valve head yet to be described. The valve body 13 adjacent the discharge end thereof is shouldered to provide a valve surface 22, the diameter of which is relatively smaller than the diameter of the portion 19 which also constitutes a valve surface for cooperating with a valve member about to be described.

Arranged within the valve body 13 is a reciprocable valve member 23 comprising the pistons or valve heads 24 and 25 connected by means of a stem 26. The head 24 is relatively larger than the head 25, the ratio of their diameters being coincident with the ratio of the diameters of the valve surfaces 19 and 22, the diameters of the heads 24 and 25 and of the valve portions 19 and 22 being also so selected that when the heads 24 and 25 are arranged within the valve portions 19 and 22, respectively, communication through the valve is interrupted.

A coil spring 27 surrounds the valve stem 26 and bears on the one hand against a shoulder 28 formed on the valve body and on the other hand against a shoulder 29 formed on the valve member 23. The spring is disposed within that portion of the bore of the valve body indicated by the reference character 30 and which together with cylindrical portion 19 constitutes the measuring chamber of the valve. The spring 27 normally urges the reciprocable valve member toward the right, as viewed in the several figures of the drawings, in which position the head 24 abuts against a stop or inlet valve seat, herein shown as a washer 31, interposed between the valve body 13 and the sleeve 15, thus normally closing the inlet to the valve. The bore formed in the valve body 13 is preferably flared outwardly at the discharge end as indicated at 32 to provide ample clearance for the escape of the lubricant around the head 25 into the discharge passage of the valve.

The valve is normally in the position shown in Figure 1 in which position the head 24 coincides with the enlarged bore portion 18, thus providing a passageway therearound for the passage of lubricant under pressure when head 24 unseats from washer 31 to open the inlet, while the head 25 is in engagement with the restricted valve portion 22, thus closing communication between the chamber 30 and the bearing 10. When lubricant under pressure is forced through the conduit 11 it will act upon the head 24 to displace the reciprocable valve member 23 axially against the action of the springs 27 and will, consequently, flow through the space between the valve head 24 and the enlarged portion 18 of the bore of the valve and into the chamber 30.

The movement of the valves 23 is opposed by the spring 27 so that it moves slowly to the left, as seen in the several figures, until it assumes the position illustrated in Figures 2 wherein the valve head 24 has moved into transient engagement with the relatively smaller portion 19 of the bore of the valve, thus shutting off communication between the source of lubricant in conduit 11 and the interior of the chamber 30. This movement of the valve is dependent mainly upon the pressure of the lubricant upon the smaller piston 25. However, coincident with this movement of the valve head 24 which closes the inlet, is the movement of the valve head 25 out of engagement with the valve portion 22 whereby the chamber 30 is placed in communication with the bearing 10.

At this point, during the operation, the supply of lubricant to the measuring chamber 30 has been cut off but a quantity of lubricant is trapped in this chamber and during the continuance of the pressure on the source of supply in conduit 11 on the valve head 24 the reciprocable valve 23 will move from the position illustrated in Figure 2 to that illustrated in Figure 3, wherein the valve head 23 has become seated on the circumferential valve portion 21 which prevents any further axial movement of the valve 23 toward the left. This movement of the valve member is accelerated by the transference of all of the lubricant pressure to the larger piston 24 when this piston enters cylindrical surface 19. At the same time the valve head 25 has been moved further into the flared portion 32 of the bore of the valve thus increasing the space between the valve head and the bore to permit easy escape of the lubricant into the bearing 10. Thus the piston 24 during its travel through cylindrical portion 19 expels the lubricant therefrom, this action being accelerated by the rapid movement of the valve member 23 as aforedescribed.

When the pressure exerted upon the lubricant in the system and consequently in the conduit 11 has been relieved pressure on the head 24 will consequently be relieved sufficient to permit the spring 27 to move the reciprocable valve member 23 toward the right to return the valve parts to the position illustrated in Figure 1. In this position of the parts the valve head 25 prevents any escape of the lubricant previously fed to the bearing backward into the valve body 13. At the same time the head 24 is seated on seat 31 closing the inlet.

Owing to the difference in diameters of the heads 24 and 25, sufficient differential pressures will be exerted upon the valve member 23 to complete its movement from the right to the left in the several figures and to accelerate this movement, despite the action of the spring 27 and the accumulated lubricant in the chamber 30 to the contrary.

From the foregoing it will be immediately obvious that irrespective of the condition of the bearing or other part constituting the point of distribution the valve herein described will permit but a limited predetermined amount of lubricant to be fed thereto.

Furthermore the amount of lubricant fed to the bearing is not increased irrespective of the length or intensity of the period of supply as the amount supplied to the bearing at each lubricating period is determined by the capacity of the chamber 30, which, of course, may be varied as the requirements of the bearing or other point of distribution dictate, and when the head 24 has been moved into its checking position it will not thereafter be returned to the open position shown in Figure 1 until the pressure on the lubricant supply has been withdrawn. Hence several bearings connected in series as hereinbefore described may be adequately supplied with lubricant irrespective of the condition of any one of the bearings of the series.

While an embodiment of the invention has been illustrated and described in some detail it will be readily apparent to those skilled in this art that various changes and modifications may be resorted to without departing from the spirit and scope of this invention, and to this end reservation is made to make such changes as may come within the purview of the accompanying claims.

What I claim as my invention is:—

1. The combination with a part to be lubricated and a source of lubricant supply, of a valve including a normally closed lubricant measuring chamber, means operable by the lubricant pressure to open said chamber to the source of lubricant supply, and further operable to close said opening and other means operable by the lubricant pressure to open communication between said chamber and the part to be lubricated.

2. The combination with a valve provided with a measuring chamber adapted to be connected at one end to a source of lubricant supply and at its other end to a part to be lubricated, of means within said valve normally closing the inlet and outlet ends of said measuring chamber and operable by the lubricant supply successively to positions wherein communication is opened between said measuring chamber and the source of lubricant supply; said communication closed; and communication opened between said measuring chamber and the part to be lubricated.

3. In a measuring valve connected respectively to a source of lubricant supply and the part to be lubricated, means having a part normally checking said inlet and another part closing said outlet and operable by the lubricant pressure to open said inlet to the source of lubricant supply and further operable by the lubricant pressure to close the inlet, open said outlet and expel the measured lubricant.

4. In a measuring valve, a body provided with an inlet connected to a source of lubricant supply and an outlet connected to the part to be lubricated, a measuring cylinder therebetween spaced from said inlet, a valve member having a valve controlling said outlet and a valve initially checking said inlet and subsequently entering said measuring cylinder, and a spring normally holding said valve member with the inlet and outlet closed, whereby when lubricant under pressure is introduced at the inlet said valve member moves to open the inlet to permit the lubricant to pass to the measuring cylinder, whereupon the inlet valve enters said measuring cylinder and subsequently said outlet valve opens, the continued movement of said valve member expelling the measured lubricant.

5. In a measuring valve, a valve body formed with an inlet connected to a source of lubricant supply, an outlet connected to the part to be lubricated, said body being formed with a measuring chamber and an outlet valve surface, a reciprocable valve member including a valve normally closing said outlet and a valve normally closing said inlet, and a spring holding said valve member in this position, whereby lubricant under pressure will move said valve member against the action of said spring to first open said chamber to said lubricant supply, then close said communication and open communication between said chamber and the part to be lubricated and then expel the measured lubricant through said outlet.

6. In a measuring valve, a valve body having inlet and outlet openings connected respectively to a source of lubricant supply and the part to be lubricated, said body being formed with a cylindrical valve surface at the outlet end, a cylindrical valve surface constituting a measuring chamber, a valve seat at the end thereof remote from the inlet and determining the capacity of said chamber, and a valve seat at the inlet; a reciprocable valve member including spaced valve pistons of differential diameters with the smaller outlet valve normally engaging said outlet valve surface and the larger valve normally engaging said inlet valve seat to close said inlet, and a spring holding said valve member in this position, whereby when lubricant under pressure is introduced at said inlet, said valve member will move to a position where lubricant may by-pass said inlet valve piston into said measuring chamber, said outlet remaining closed, whereupon the pressure upon the smaller piston moves said valve member to cause said inlet piston to enter said measuring chamber and check the supply of lubricant and said outlet piston to open, whereupon the entire pressure of the lubricant source acts upon the larger inlet piston to accelerate the movement of the valve member, the lubricant in the measuring chamber being expelled by the movement of the inlet piston therein, this movement being arrested by the engagement of said piston with the valve seat at the end of the measuring chamber.

7. In a measuring valve, a valve body provided with inlet and outlet ends, a cylindrical valve surface at the outlet end, a valve seat at the inlet end, a cylindrical valve surface intermediate thereof constituting a measuring chamber and a clearance chamber between said last mentioned valve surface and said valve seat; a reciprocable valve member having a valve piston working in said outlet valve surface and normally closing said outlet, and an inlet valve piston spaced therefrom and adapted for reciprocable engagement with said measuring chamber but normally engaging said valve seat for closing said inlet, and a spring normally holding said valve member in this position whereby, upon the introduction of lubricant under pressure at the inlet end, said inlet piston is unseated and lubricant passes therearound to the measuring chamber, said outlet piston maintaining said outlet closed, whereupon the pressure of the lubricant upon said outlet piston moves said valve member to the position wherein said inlet piston engages the adjacent end of said measuring chamber to check the lubricant supply, the entire pressure of the source of lubricant thereafter acting upon the inlet piston to move the valve member to open said outlet valve, the continued movement of said inlet piston in said measuring chamber expelling the lubricant therefrom.

8. In a measuring valve, a body provided with inlet and outlet openings, spaced cylinders, one constituting a measuring chamber, and a valve seat adjacent the inlet opening; a valve member including inlet and outlet pistons operable in said cylinders, with the inlet piston normally engaging said valve seat to close said inlet, said pistons being spaced, whereby said inlet piston engages its cylinder before the outlet piston moves out of its cylinder, whereby a measured quantity of lubricant may be admitted to the measuring chamber and subsequently expelled by the inlet pistons, said pistons acting to prevent the free passage of lubricant through the valve.

9. In a measuring valve, a body provided with inlet and outlet openings, spaced cylinders, the one adjacent the inlet constituting a measuring chamber, and a valve seat adjacent the inlet opening; a valve member including an inlet piston normally engaging said valve seat to close said inlet and movable into engagement with said measuring chamber cylinder, and an outlet piston normally positioned within the other of said cylinders for closing the outlet, said pistons being so spaced that upon movement of said valve member said inlet piston engages its cylinder before the outlet piston moves out of its cylinder, whereby upon the introduction at the inlet of lubricant under pressure a measured quantity thereof in the measuring chamber will be expelled through the outlet by the movement of the inlet piston through its cylinder.

10. In a measuring valve, a valve body provided with inlet and outlet ends, a cylindrical valve surface and an adjacent clearance chamber at the outlet end, a valve seat at the inlet end, a cylindrical valve surface intermediate thereof constituting a measuring chamber, and a clearance chamber between said last mentioned valve surface and said valve seat, a reciprocable valve member having a valve piston working in said outlet valve surface and normally closing said outlet, and an inlet valve piston spaced therefrom and adapted for reciprocable engagement with said measuring chamber but normally engaging said valve seat for closing said inlet, and a spring normally holding said valve member in this position, whereby, upon the introduction of lubricant under pressure at the inlet end said inlet piston is unseated and lubricant passes therearound to the measuring chamber, said outlet piston maintaining said outlet closed, whereupon the pressure of the lubricant upon said outlet piston moves said valve member to the position wherein said inlet piston engages the adjacent end of said measuring chamber to check the further passage of lubricant, the entire pressure of the source of lubricant thereafter acting upon the inlet piston to move the outlet piston of the valve member into said clearance space, the continued movement of said inlet piston in said measuring chamber expelling the lubricant therefrom.

11. A measuring valve of the herein described character comprising a body bored to provide a cylindrical valve surface, a spring chamber, a circumferential valve seat, a second cylindrical valve surface and a clearance chamber arranged longitudinally of the body in the order named and of successively increasing diameters.

12. In a device of the class described, the combination with a source of lubricant adapted to be periodically placed under pressure and a part to be lubricated, of a casing provided with a measuring chamber having inlet and outlet ends connected respectively to said source of lubricant and said part to be lubricated, a member normally preventing the passage of lubricant through said chamber and operable by the lubricant under pressure to alternately close and open the inlet and outlet ends of said measuring chamber, said operations overlapping to provide a period wherein both ends are closed, said member being also operable to expel the lubricant within said chamber and means for returning said member to normal position upon relief of the pressure upon the lubricant.

13. In a valve device, a casing providing a measuring chamber connected respectively to a source of lubricant supply and a part to be lubricated, a member in said casing including spaced pistons and means normally preventing the passage of lubricant through said chamber, said member being movable by the lubricant under pressure to open communication between said source of supply and said chamber, to then close said communication, to open said outlet and expel the measured lubricant through said outlet and means for returning said member to normal position.

14. In a metering device, a casing connected respectively to a source of lubricant supply and a part to be lubricated, and provided with a cylinder portion, spaced pistons within said casing normally closing the inlet and outlet ends thereof, said pistons being movable by the lubricant pressure whereupon said inlet piston opens said inlet and moves into said cylinder, said outlet piston subsequently opening said outlet while said inlet piston moves through said cylinder to expel the lubricant contained therein.

15. In a device of the character described, a casing having an inlet end connected to a source of lubricant, an outlet end connected to a part to be lubricated and a measuring cylinder intermediate said ends, a member including two pistons arranged in said casing, one of said pistons normally closing said inlet and the other said outlet, said member being moved by the lubricant under pressure to open said inlet and move said first piston into said measuring cylinder to thereupon close communication between said lubricant source and measuring cylinder; to move said other piston to open said outlet; and move said first piston through said cylinder to expel the lubricant therefrom.

16. In a device of the character described, a casing having an inlet end connected to a source of lubricant, an outlet end connected to a part to be lubricated and a measuring cylinder intermediate said ends, a member normally preventing the passage of lubricant through said measuring cylinder and reciprocable within said casing and including means movable into engagement with said measuring cylinder and other means for controlling said outlet, whereby lubricant under pressure will move said member to close communication between said lubricant source and said measuring cylinder, open said outlet and expel the lubricant in said measuring cylinder.

17. In a device of the character described, a casing having an inlet and connected to a source of lubricant, an outlet end connected to a part to be lubricated and a measuring cylinder intermediate said ends, a reciprocable member within said casing comprising differential pistons, the larger of which normally closes said inlet and is movable to enter said cylinder to expel the contents thereof, the smaller of said pistons normally closing said outlet, said member being movable by the lubricant under pressure to successively open said inlet, close communication between the lubricant source and said cylinder, open said outlet and expel the lubricant in said cylinder, the latter action being accelerated by the lubricant pressure upon the larger piston.

In testimony whereof I affix my signature.

WILLIAM S. PRITCHARD.